(12) United States Patent
Tsukamoto

(10) Patent No.: US 8,463,063 B2
(45) Date of Patent: Jun. 11, 2013

(54) IMAGE PROCESSING APPARATUS, METHOD AND PROGRAM FOR GRADATION CONVERSION

(75) Inventor: Makoto Tsukamoto, Kanagawa (JP)

(73) Assignee: Sony Corporation (JP)

( * ) Notice: Subject to any disclaimer, the term of this patent is extended or adjusted under 35 U.S.C. 154(b) by 915 days.

(21) Appl. No.: 12/587,653

(22) Filed: Oct. 9, 2009

(65) Prior Publication Data

US 2010/0098337 A1 Apr. 22, 2010

(30) Foreign Application Priority Data

Oct. 22, 2008 (JP) ................ P2008-272169

(51) Int. Cl.
*G06K 9/00* (2006.01)
*G06K 9/40* (2006.01)
(52) U.S. Cl.
USPC .......................................... 382/252; 382/274
(58) Field of Classification Search
USPC ... 382/251, 252, 274; 348/251, 254; 358/461, 358/465, 466
See application file for complete search history.

(56) References Cited

U.S. PATENT DOCUMENTS

| | | | | |
|---|---|---|---|---|
| 5,070,515 | A | * 12/1991 | Iwahashi et al. | ............... 375/245 |
| 2003/0202000 | A1* | 10/2003 | Kudo et al. | ..................... 345/690 |
| 2005/0253784 | A1* | 11/2005 | De Greef et al. | ............... 345/63 |

FOREIGN PATENT DOCUMENTS

WO 2004017287 A2 2/2004

OTHER PUBLICATIONS

Sun, Z. ("A method of generating halftone video," IEEE ICASSP 2005).*
Scholnik et al. ("Joint shaping of quantization and hardware-mismatch errors in a multibit delta-sigma DAC," Proceedings 43th IEEE Symposium on Circuits and Systems 2000, vol. 2, pp. 664-667).*
Scholnik et al. ("Joint shaping of quantization and hardware-mismatch errors in a multibit delta-sigma DAC," Proceeding $43^{rd}$ IEEE Midwest Symp. on Crcuits and Systems, Aug. 8-11, 2000, pp. 664-667).*
Hitoshi Takaie "Easy Understanding Digital Image Processing" 6th Edition, CQ Co. Ltd., Jan. 2000, pp. 196-213.
European Search Report EP 09173686, dated Jun. 30, 2010.

* cited by examiner

*Primary Examiner* — Yubin Hung
(74) *Attorney, Agent, or Firm* — Lerner, David, Littenberg, Krumholz & Mentlik, LLP

(57) ABSTRACT

An image processing apparatus includes a first calculating unit configured to add a pixel value and an output of a filter unit, a first quantizing unit configured to quantize an output of the first calculating unit and output a quantized value serving as $\Delta\Sigma$ modulation data, a second calculating unit configured to calculate a difference between the output of the first calculating unit and the quantized value, thereby obtaining the quantization error, a second quantizing unit configured to quantize a portion of the quantization error and output compensating data, a third calculating unit configured to add the $\Delta\Sigma$ modulation data and the compensating data, thereby generating time-integration-effect-using error diffusion data, a fourth calculating unit configured to calculate a difference between the quantization error and the compensating data, the difference serving as a $\Delta\Sigma$ modulation error, and the filter unit configured to perform filtering in space directions.

9 Claims, 12 Drawing Sheets

FIG. 4A   8 BITS   
FIG. 4B   8 BITS   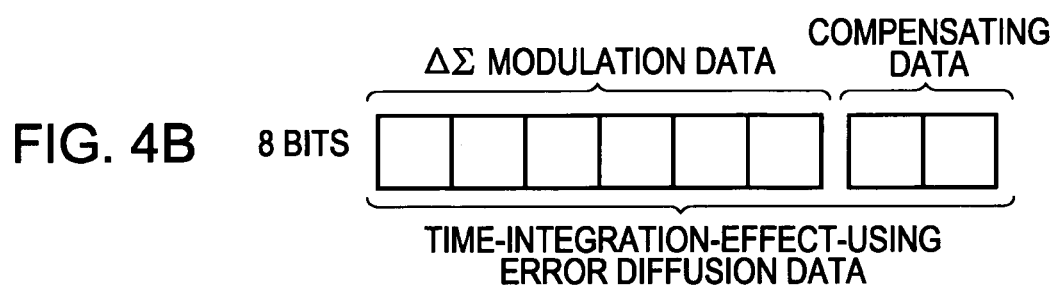

$$\begin{cases} g(1,1) = -0.0317 \\ g(2,1) = -0.1267 \\ g(3,1) = -0.1900 \\ g(4,1) = -0.1267 \\ g(5,1) = -0.0317 \\ g(1,2) = -0.1267 \\ g(2,2) = 0.2406 \\ g(3,2) = 0.7345 \\ g(4,2) = 0.2406 \\ g(5,2) = -0.1267 \\ g(1,3) = -0.1900 \\ g(2,3) = 0.7345 \end{cases}$$

$$\begin{cases} g(1, 1) = -0.0249 \\ g(2, 1) = -0.0996 \\ g(3, 1) = -0.1494 \\ g(4, 1) = -0.0996 \\ g(5, 1) = -0.0249 \\ g(1, 2) = -0.0996 \\ g(2, 2) = 0.2248 \\ g(3, 2) = 0.6487 \\ g(4, 2) = 0.2248 \\ g(5, 2) = -0.0996 \\ g(1, 3) = -0.1494 \\ g(2, 3) = 0.6487 \end{cases}$$

$$\begin{cases} g(1,1)=-0.0397 \\ g(2,1)=-0.1586 \\ g(3,1)=-0.2379 \\ g(4,1)=-0.1586 \\ g(5,1)=-0.0397 \\ g(1,2)=-0.1586 \\ g(2,2)=0.2592 \\ g(3,2)=0.8356 \\ g(4,2)=0.2592 \\ g(5,2)=-0.1586 \\ g(1,3)=-0.2379 \\ g(2,3)=0.8356 \end{cases}$$

IMAGE PROCESSING APPARATUS, METHOD AND PROGRAM FOR GRADATION CONVERSION

CROSS-REFERENCE TO RELATED APPLICATION

The present application claims priority from Japanese Patent Application No. JP 2008-272169 filed in the Japanese Patent Office on Oct. 22, 2008, the entire content of which is incorporated herein by reference.

BACKGROUND OF THE INVENTION

1. Field of the Invention

The present invention relates to an image processing apparatus, an image processing method, and a program. Particularly, the present invention relates to an image processing apparatus, an image processing method, and a program that enable an improvement in perceived image quality after gradation conversion.

2. Description of the Related Art

For example, in a case where an image of a large number of bits, such as an image in which each of RGB (Red, Green, and Blue) values is 8 bits, is to be displayed on a display of a small number of bits, such as an LCD (Liquid Crystal Display) capable of displaying an image in which each of RGB values is 6 bits, it is necessary to perform gradation conversion for converting the gradation level of the image.

An example of a method for performing the gradation conversion is an FRC (Frame Rate Control) process.

In the FRC process, the frame rate of images to be displayed on a display is adjusted to match the display rate of the display, the display rate being four times higher than the frame rate, for example, and then the images are displayed on the display.

That is, for example, assume that 8-bit images are to be displayed on a 6-bit LCD. When the focus is put on a pixel in a frame of the 8-bit images, the frame is called a target frame and the pixel is called a target pixel.

Also, assume that the frame rate (or the field rate) of the 8-bit images is 60 Hz and that the display rate of the 6-bit LCD is four times the frame rate of the 8-bit images, that is, 240 Hz.

In the FRC process, the frame rate of the images is controlled to be four times so that the frame rate matches the display rate of the display, and then images having a frame rate that has been controlled are displayed.

That is, four (=240 Hz/60 Hz) 1-bit values that correspond to lower two (=8−6) bits among 8 bits in total of a pixel value of the target pixel are represented by ($b_0$, $b_1$, $b_2$, and $b_3$).

A 6-bit value obtained by truncating the lower 2 bits of the 8-bit pixel value (the value obtained by simply quantizing the 8-bit pixel value into a 6-bit pixel value) is represented by X.

In the FRC process, basically, an 8-bit pixel value is converted into four 6-bit pixel values (the pixel values at the position of the target pixel in sequential four frames) $X+b_0$, $X+b_1$, $X+b_2$, and $X+b_3$.

Specifically, in a case where the 8-bit pixel value of the target pixel is 127 (=01111111B), B indicating that the preceding value is a binary number, a 6-bit value X obtained by truncating the lower 2 bits of the 8-bit pixel value is 31 (=011111B).

Also, as the four 1-bit values ($b_0$, $b_1$, $b_2$, and $b_3$) that correspond to the lower two bits 11B (=3) among 8 bits in total of the pixel value 127 (=01111111B) of the target pixel, (0B, 1B, 1B, and 1B) are used, for example.

Therefore, the 8-bit pixel value 127 (=01111111B) of the target pixel is converted into four 6-bit pixel values $X+b_0$=31 (=011111B), $X+b_1$=32 (=100000B), $X+b_2$=32 (=100000B), and $X+b_3$=32 (=100000B).

In the FRC process, a target frame is converted into four frames so that a frame rate matches the display rate of an LCD. Now, assume that the four frames are called first, second, third, and fourth frames in display time series. In this case, the pixel values of pixels at the position of the target pixel in the first to fourth frames correspond to the above-described four 6-bit pixel values 31, 32, 32, and 32 in the FRC process.

In the FRC process, the first to fourth frames are displayed on the LCD at a display rate four times the original frame rate. In this case, at the position of the target pixel, the 6-bit pixel values 31, 32, 32, and 32 are integrated (added) in a time direction in human vision, so that the pixel value looks like 127.

As described above, in the FRC process, 127 as an 8-bit pixel value is expressed by 6 bits in a pseudo manner with use of a time integration effect in which integration in a time direction is performed in human vision.

In the FRC process, a process of converting an 8-bit pixel value into four 6-bit pixel values is performed by using an LUT (Look Up Table) storing the 8-bit pixel value and the four 6-bit pixel values that are mutually associated.

Another example of the method for performing the gradation conversion is an error diffusion method (e.g., see "Yoku wakaru dijitaru gazou shori" by Hitoshi KIYA, Sixth edition, CQ Publishing, Co. Ltd., January 2000, pp. 196-213).

In gradation conversion based on the error diffusion method, noise shaping to a high range of spatial frequencies is performed on noise, which is a quantization error of a pixel value of a pixel that is spatially approximate to a target pixel, and the noise on which noise shaping has been performed is added to the pixel value of the target pixel, whereby error diffusion is performed (error diffusion of adding a quantization error of a pixel value of a target pixel to a pixel value of a pixel that is spatially approximate to the target pixel). Then, the pixel value to which the noise has been added is quantized into a desired number of bits.

The gradation conversion based on the error diffusion method is two-dimensional $\Delta\Sigma$ modulation in space directions, in which a pixel value is quantized after noise (quantization error) has been added thereto, as described above. Therefore, in a quantized (gradation-converted) image, it looks like PWM (Pulse Width Modulation) has been performed on pixel values that become constant only by truncating lower bits. As a result, the gradation of a gradation-converted image looks like it smoothly changes due to a space integration effect in which integration in space directions is performed in human vision. That is, a gradation level equivalent to that of an original image (e.g., 256 ($2^8$)-gradation when the original image is an 8-bit image as described above) can be expressed in a pseudo manner.

Also, in the error diffusion method, noise (quantization error) after noise shaping is added to a pixel value in consideration that the sensitivity of human vision is low in a high range of spatial frequencies. Accordingly, the level of noise noticeable in a gradation-converted image can be decreased.

SUMMARY OF THE INVENTION

In the error diffusion method, noise after noise shaping is added to a pixel value and thus the level of noise noticeable in a gradation-converted image can be decreased, as described above. However, when the amount of noise added to a pixel value is large, the noise added to the pixel value, that is, the noise diffused in space directions, can be noticeable in a gradation-converted image.

As a method for preventing noise from being noticeable in a gradation-converted image, a method for reducing the amount of noise that is diffused in space directions can be accepted. In this method, however, an effect of error diffusion (an effect of the error diffusion method) is insufficient, and a perceived gradation level decreases.

Accordingly, it is desirable to improve a perceived image quality by preventing noise from being noticeable in a gradation-converted image without causing a decrease in perceived gradation level of the gradation-converted image.

According to an embodiment of the present invention, there is provided an image processing apparatus including first calculating means for adding a pixel value of an image and an output of filter means for performing filtering in space directions on a quantization error of a quantized value obtained by quantizing the pixel value of the image, first quantizing means for quantizing an output of the first calculating means and outputting a quantized value including the quantization error, the quantized value serving as $\Delta\Sigma$ modulation data, which is a result of $\Delta\Sigma$ modulation performed on the pixel value, second calculating means for calculating a difference between the output of the first calculating means and the quantized value of the output of the first calculating means, thereby obtaining the quantization error, second quantizing means for quantizing a portion of the quantization error and outputting a quantized value obtained through the quantization, the quantized value serving as compensating data for compensating for error diffusion in space directions, third calculating means for adding the $\Delta\Sigma$ modulation data and the compensating data, thereby generating time-integration-effect-using error diffusion data that generates an effect of an error diffusion method using a visual integration effect in a time direction, fourth calculating means for calculating a difference between the quantization error and the compensating data, the difference serving as a $\Delta\Sigma$ modulation error, which is a quantization error used for the $\Delta\Sigma$ modulation, and the filter means for performing filtering in space directions on the $\Delta\Sigma$ modulation error. Also, there is provided a program causing a computer to function as the image processing apparatus.

According to an embodiment of the present invention, there is provided an image processing method including the steps of adding a pixel value of an image and an output of filter means, the adding being performed by first calculating means, quantizing an output of the first calculating means and outputting a quantized value including a quantization error, the quantized value serving as $\Delta\Sigma$ modulation data, the quantizing and the outputting being performed by first quantizing means, calculating a difference between the output of the first calculating means and the quantized value of the output of the first calculating means, thereby obtaining the quantization error, the calculating being performed by second calculating means, quantizing a portion of the quantization error and outputting compensating data, the quantizing and the outputting being performed by second quantizing means, adding the $\Delta\Sigma$ modulation data and the compensating data, thereby generating time-integration-effect-using error diffusion data, the adding being performed by third calculating means, calculating a difference between the quantization error and the compensating data, the difference serving as a $\Delta\Sigma$ modulation error, the calculating being performed by fourth calculating means, and performing filtering in space directions on the $\Delta\Sigma$ modulation error, the performing being performed by the filter means.

In the foregoing image processing apparatus, image processing method, and program, the first calculating means adds a pixel value of an image and an output of the filter means, and the first quantizing means quantizes an output of the first calculating means and outputs $\Delta\Sigma$ modulation data. Furthermore, the second calculating means calculates a difference between the output of the first calculating means and the quantized value of the output of the first calculating means, thereby obtaining a quantization error. The second quantizing means quantizes a portion of the quantization error and outputs compensating data. The third calculating means adds the $\Delta\Sigma$ modulation data and the compensating data, thereby generating time-integration-effect-using error diffusion data. The fourth calculating means calculates a difference between the quantization error and the compensating data, the difference serving as a $\Delta\Sigma$ modulation error. The filter means performs filtering in space directions on the $\Delta\Sigma$ modulation error.

The image processing apparatus may be an independent apparatus or may be an internal block constituting an apparatus.

The program can be provided by being transmitted via a transmission medium or by being recorded on a recording medium.

According to the above-described embodiments of the present invention, a perceived image quality after gradation conversion can be improved.

BRIEF DESCRIPTION OF THE DRAWINGS

FIGS. 4A to 4C illustrate data handled in the gradation converting unit;

DESCRIPTION OF THE PREFERRED EMBODIMENTS

Figure 1:
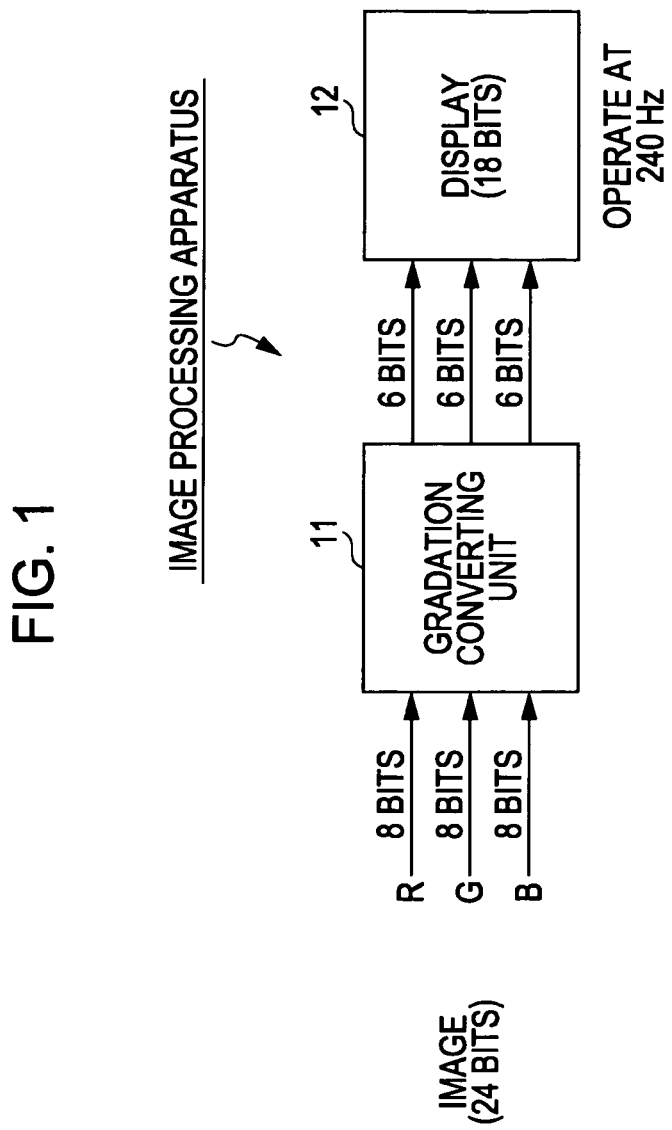
FIG. 1 is a block diagram illustrating an exemplary configuration of an image processing apparatus according to an embodiment of the present invention.

Exemplary configuration of an image processing apparatus according to an embodiment of the present invention FIG. 1 is a block diagram illustrating an exemplary configuration of an image processing apparatus according to an embodiment of the present invention.

The image processing apparatus in FIG. 1 includes a gradation converting unit 11 and a display 12, and is applied to a television receiver (hereinafter referred to as TV) or the like.

The gradation converting unit 11 is supplied with, as target image data, image data in which each of RGB components is 8 bits. The gradation converting unit 11 performs gradation conversion of converting the 8-bit target image data supplied thereto into 6-bit image data (image data in which each of RGB components is 6 bits) that can be displayed on the display 12, and supplies the gradation-converted 6-bit image data to the display 12.

In this embodiment, the frame rate (or the field rate) of the 8-bit target image data is 60 Hz, for example, and the display rate of the display 12 that displays 6-bit image data is 240 Hz, four times the frame rate of the 8-bit target image data.

Also, the gradation converting unit 11 performs frame rate conversion during gradation conversion of the 8-bit target image data into 6-bit image data (in this case, the frame rate is converted from 60 Hz, which is the frame rate of the target image data, into 240 Hz, which is the display rate of the display 12).

The display 12 is a 6-bit LCD capable of displaying 6-bit image data at a display rate of 240 Hz, and displays (images corresponding to) 6-bit image data supplied from the gradation converting unit 11.

In the gradation converting unit 11, gradation conversion of the 8-bit target image data is performed independently for each of RGB components, for example.

Exemplary Configuration of the Gradation Converting Unit 11

Figure 2:
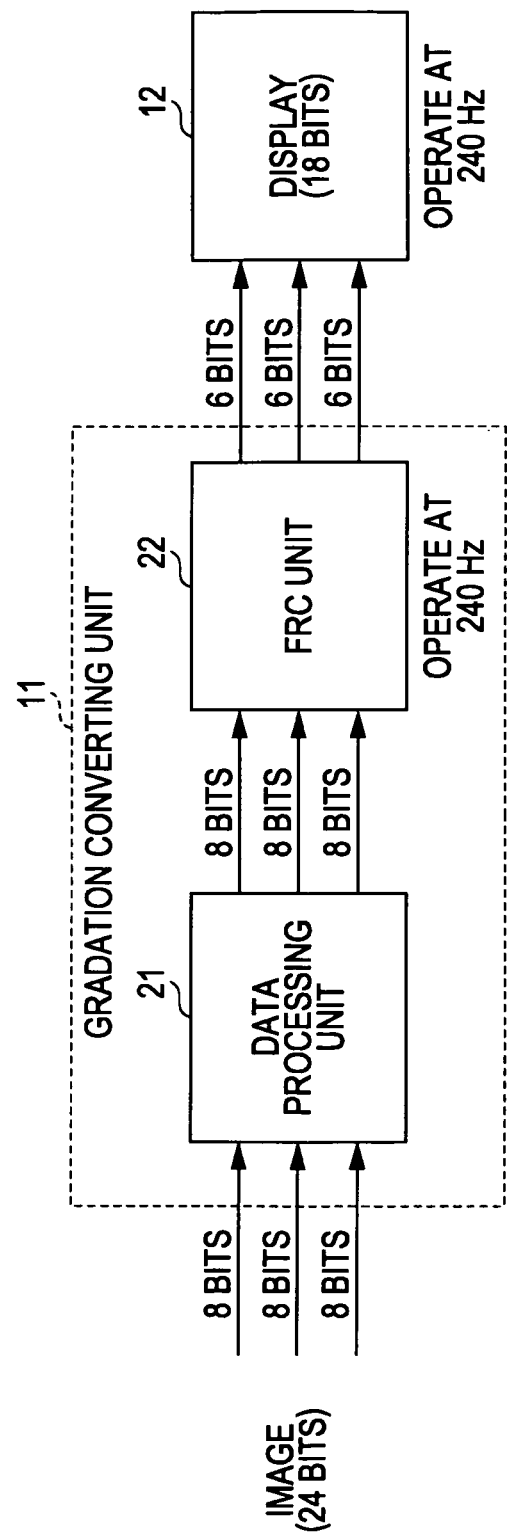
FIG. 2 is a block diagram illustrating an exemplary configuration of a gradation converting unit of the image processing apparatus.

FIG. 2 illustrates an exemplary configuration of the gradation converting unit 11 in FIG. 1.

The gradation converting unit 11 includes a data processing unit 21 and an FRC unit 22.

The data processing unit 21 is supplied with 8-bit target image data. The data processing unit 21 performs predetermined data processing on the 8-bit target image data, thereby generating image data serving as time-integration-effect-using error diffusion data for generating an effect of the error diffusion method by using a time integration effect (visual integration effect in a time direction).

The time-integration-effect-using error diffusion data that is generated from the 8-bit target image data by the data processing unit 21 is 8-bit image data in which the number of bits (of a pixel value) is the same as that of the target image data, and is image data in which the frame rate is also the same as that of the target image data (60 Hz).

The time-integration-effect-using error diffusion data, which is image data in which the number of bits is eight and the frame rate is 60 Hz, is supplied from the data processing unit 21 to the FRC unit 22.

The FRC unit 22 performs an FRC process to convert the time-integration-effect-using error diffusion data supplied from the data processing unit 21, which is image data in which the number of bits is eight and the frame rate is 60 Hz, into image data in which the number of bits is six and the frame rate is 240 Hz. Then, the FRC unit 22 supplies the image data as gradation-converted image data to the display 12.

Each of the data processing unit 21 and the FRC unit 22 can be realized by dedicated hardware or software.

However, since the FRC process has already been realized by hardware, existing hardware can be adopted for the FRC unit 22.

In a case where the FRC unit 22 is realized by software instead of by existing software, it is necessary for the FRC unit 22 to be configured to operate at a speed four times that of the data processing unit 21 because the FRC unit handles image data having a frame rate of 240 Hz, four times the frame rate of image data handled by the data processing unit 21.

Exemplary Configuration of the Data Processing Unit 21

Figure 3:
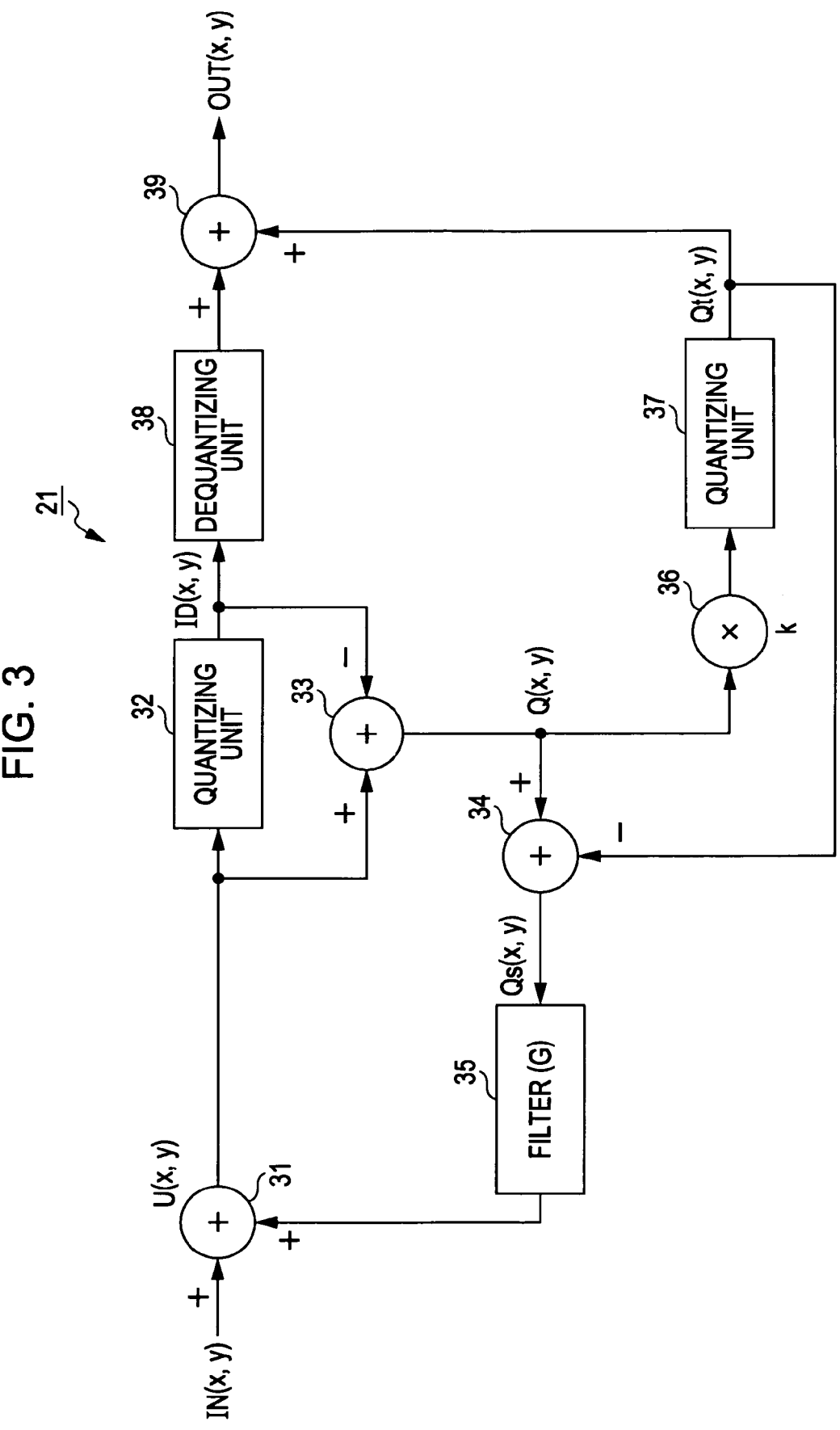
FIG. 3 is a block diagram illustrating an exemplary configuration of a data processing unit of the gradation converting unit.

FIG. 3 illustrates an exemplary configuration of the data processing unit 21 in FIG. 2.

Referring to FIG. 3, the data processing unit 21 includes an calculating unit 31, a quantizing unit 32, calculating units 33 and 34, a filter 35, a calculating unit 36, a quantizing unit 37, a dequantizing unit 38, and a calculating unit 39.

The calculating unit 31 is supplied with pixel values IN(x, y) of N (=8) bits of pixels in target image data in a raster scanning order. Furthermore, the calculating unit 31 is supplied with outputs of the filter 35, which performs filtering in space directions on a quantization error of a quantized value obtained by quantizing a pixel value of the target image data.

The calculating unit 31 adds the pixel value IN(x, y) of the target image data and the output of the filter 35 and supplies (outputs) a sum value U(x, y) obtained thereby to the quantizing unit 32 and the calculating unit 33.

Here, IN(x, y) represents a pixel value of the pixel (x, y) x-th from the left and y-th from the top. U(x, y) represents a sum value of the pixel value IN(x, y) and the output of the filter 35.

The quantizing unit 32 quantizes the sum value U(x, y), which is the output of the calculating unit 31, into the number of bits smaller than the number of bits N (=8) of the target image data, i.e., into the number of bits M (=6) of an image that can be displayed on the display 12 (FIG. 1), and then outputs a quantized value of M (=6) bits obtained thereby as $\Delta\Sigma$ modulation data ID(x, y), which is a result of $\Delta\Sigma$ modulation performed on the pixel value IN (x, y).

In the data processing unit 21 in FIG. 3, the calculating unit 31 and the quantizing unit 32 described above and the calculating unit 33 and the filter 35 described below constitute a $\Delta\Sigma$ modulator that performs $\Delta\Sigma$ modulation, and the output of the quantizing unit 32 is a result of $\Delta\Sigma$ modulation performed on the pixel value IN(x, y) supplied to the calculating unit 31.

The $\Delta\Sigma$ modulation data ID(x, y) of M (=6) bits output from the quantizing unit 32 is supplied to the calculating unit 33 and the dequantizing unit 38.

The calculating unit 33 calculates a difference U(x, y)–ID(x, y) between the sum value U(x, y), which is the output of the calculating unit 31, and the $\Delta\Sigma$ modulation data ID(x, y) of M (=6) bits, which is the output of the quantizing unit 32 and which is a quantized value of the sum value U(x, y), thereby obtaining a quantization error Q(x, y) included in the $\Delta\Sigma$ modulation data ID(x, y) as a quantized value, and outputs the quantization error Q(x, y).

The quantization error Q(x, y) output from the calculating unit 33 is supplied to the calculating units 34 and 36.

The calculating unit 34 is supplied with compensating data Qt(x, y), which is a quantized value of a portion of the quantization error Q(x, y), from the quantizing unit 37, in addition to the quantization error Q(x, y) output from the calculating unit 33.

The calculating unit 34 calculates a difference Q(x, y)–Qt(x, y) between the quantization error Q(x, y) supplied from the calculating unit 33 and the compensating data Qt(x, y) supplied from the quantizing unit 37, the difference being regarded as a $\Delta\Sigma$ modulation error Qs(x, y) serving as a quantization error used for ΔΣ modulation performed in the ΔΣ modulator, and supplies the ΔΣ modulation error Qs(x, y) to the filter 35.

The filter 35 is an FIR (Finite Impulse Response) filter for performing two-dimensional filtering in space directions (horizontal and vertical directions), and performs filtering in space directions (hereinafter referred to as space-direction filtering) on the ΔΣ modulation error Qs(x, y), which is a quantization error supplied from the calculating unit 34. Furthermore, the filter 35 supplies (outputs) a filtering result to the calculating unit 31.

Here, a transfer function of the filter 35 is represented by G. In this case, the ΔΣ modulation data ID(x, y) output from the quantizing unit 32 is expressed by expression (1).

$$ID(x,y)=IN(x,y)-(1-G)k'Q(x,y) \qquad (1)$$

In expression (1), the quantization error Q (x, y) is modulated with $-(1-G)k'$. The modulation with $-(1-G)k'$ corresponds to noise shaping based on ΔΣ modulation in space directions.

In FIG. 3, a value obtained by subtracting the compensating data Qt(x, y) obtained in the quantizing unit 37 from the quantization error Q(x, y) is used as the ΔΣ modulation error Qs(x, y).

Now, assume that a weight having a value in the range from 0 to 1 is represented by k' and that the ΔΣ modulation error Qs(x, y) is expressed by an expression Qs(x, y)=k'×Q(x, y) using the quantization error Q(x, y). In this case, in the data processing unit 21 in FIG. 3, only a portion for the weight k' (ΔΣ modulation error Qs(x, y)) of the quantization error Q(x, y) as noise is used for ΔΣ modulation (noise shaping based on ΔΣ modulation is performed).

Therefore, the ΔΣ modulation data ID(x, y) obtained through such ΔΣ modulation is data in which error diffusion in space directions is performed on only a portion for the weight k' of the quantization error Q(x, y) in the target image data.

The calculating unit 36 extracts a portion of the quantization error Q(x, y) supplied from the calculating unit 33 and supplies the extracted portion to the quantizing unit 37. Specifically, the calculating unit 36 multiplies the quantization error Q(x, y) supplied from the calculating unit 33 by a weight k having a value in the range from 0 to 1, thereby extracting a portion k×Q(x, y) of the quantization error Q(x, y), and supplies the portion k×Q(x, y) to the quantizing unit 37.

The weight k used in the calculating unit 36 and the above-described weight k' have a relationship in which one is small when the other is large.

The quantizing unit 37 quantizes the portion k×Q(x, y) of the quantization error Q(x, y) supplied from the calculating unit 36 into N–M (=8–6=2) bits. Furthermore, the quantizing unit 37 outputs a quantized value of N–M (=2) bits obtained thereby as compensating data Qt(x, y) for compensating for error diffusion in space directions by an FRC process performed by the FRC unit 22 (FIG. 2) in the subsequent stage of the data processing unit 21.

The compensating data Qt(x, y) of N–M (=2) bits output from the quantizing unit 37 is supplied to the calculating units 34 and 39.

The dequantizing unit 38 dequantizes the ΔΣ modulation data ID(x, y) of M (=6) bits supplied from the quantizing unit 32 into N (=8), which is the number of bits of the original pixel value IN(x, y), and supplies it to the calculating unit 39.

That is, the dequantizing unit 38 adds 0 to the lower N–M (=2) bits of the ΔΣ modulation data ID(x, y) of M (=6) bits, thereby obtaining ΔΣ modulation data of N (=8) bits (hereinafter referred to as dequantized ΔΣ modulation data), and supplies the dequantized ΔΣ modulation data to the calculating unit 39.

The calculating unit 39 adds the dequantized ΔΣ modulation data of N (=8) bits supplied from the dequantizing unit 38 and the compensating data Qt(x, y) of N–M (=2) bits supplied from the quantizing unit 37, thereby generating time-integration-effect-using error diffusion data OUT(x, y) of N (=8) bits, and supplies the data to the FRC unit 22.

Here, the dequantized ΔΣ modulation data of N (=8) bits is data generated by adding 0 to the lower N–M (=2) bits of the ΔΣ modulation data ID(x, y) of M (=6) bits. Therefore, the time-integration-effect-using error diffusion data OUT(x, y) of N (=8) bits, which is obtained by adding the dequantized ΔΣ modulation data and the compensating data Qt(x, y) of N–M (=2) bits, is data obtained by adding the compensating data Qt(x, y) of N–M (=2) bits to the lower N–M (=2) bits of the ΔΣ modulation data ID(x, y) of M (=6) bits.

Data Handled in the Gradation Converting Unit 11

Data handled in the gradation converting unit 11 in FIG. 2 is described with reference to FIGS. 4A to 4C.

FIG. 4A illustrates a pixel value IN(x, y) of 8 (=N) bits of target image data having a frame rate of 60 Hz, supplied to (the calculating unit 31 of) the data processing unit 21.

FIG. 4B illustrates time-integration-effect-using error diffusion data OUT(x, y) of 8 (=N) bits having a frame rate of 60 Hz, obtained for the 8-bit pixel value IN (x, y) in FIG. 4A in (the calculating unit 39 of) the data processing unit 21.

As described above with reference to FIG. 3, the time-integration-effect-using error diffusion data OUT(x, y) of 8 (=N) bits is obtained by adding the compensating data Qt(x, y) of 2 (=N–M) bits to the lower 2 (=N–M) bits of the ΔΣ modulation data ID(x, y) of 6 (=M) bits.

Figure 4C:
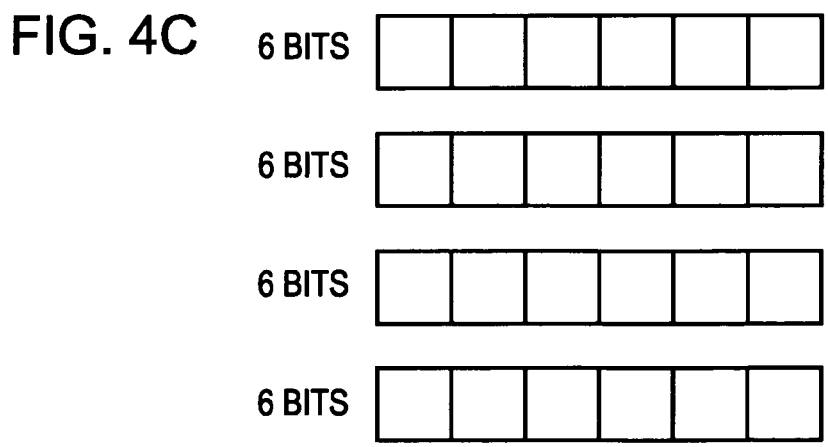

FIG. 4C illustrates pixel values of 6 (=M) bits of gradation-converted image data having a frame rate of 240 Hz, obtained for the time-integration-effect-using error diffusion data OUT(x, y) of 8 (=N) bits supplied from (the calculating unit 39 of) the data processing unit 21 in the FRC unit 22.

Assume that, in the time-integration-effect-using error diffusion data OUT(x, y), which is a pixel value of 8 bits in total, four 1-bit values that correspond to the lower (=N–M) bits are represented by ($b_0$, $b_1$, $b_2$, and $b_3$), as described above. Also, assume that a 6-bit value obtained by truncating the lower two bits of the 8-bit time-integration-effect-using error diffusion data OUT(x, y) is represented by X.

Here, as illustrated in FIG. 4B, the lower two bits of the 8-bit time-integration-effect-using error diffusion data OUT (x, y) is 2-bit compensating data Qt(x, y), and a (remaining) 6-bit value X obtained by truncating the lower two bits is 6-bit ΔΣ modulation data ID(x, y).

In the FRC process, the 8-bit time-integration-effect-using error diffusion data OUT(x, y) is converted into four 6-bit pixel values at the same position in a temporally-sequential four frames (pixel values at the position of the target pixel in sequential four frames) $X+b_0$, $X+b_1$, $X+b_2$, and $X+b_3$, as described above.

In the 6-bit pixel values $X+b_i$ (i=0, 1, 2, and 3) obtained in the FRC process, a 6-bit value X is the ΔΣ modulation data ID(x, y) of the upper 6 bits of the time-integration-effect-using error diffusion data OUT(x, y).

As described above with reference to FIG. 3, the 6-bit ΔΣ modulation data ID(x, y) is data in which error diffusion in space directions is performed on only a portion for the weight k' of the quantization error Q(x, y) in the target image data.

The 6-bit ΔΣ modulation data ID(x, y) contributes to an improvement in perceived gradation of a gradation-converted image using a space integration effect due to an effect of error diffusion in space directions of only a portion for the weight k' of the quantization error $Q(x, y)$.

The four 6-bit pixel values $X+b_0$, $X+b_1$, $X+b_2$, and $X+b_3$ obtained in the FRC process are displayed on the display 12 (FIG. 1) at a display rate of 240 Hz, but the pixel values are perceived by human vision as a sum total $2^2 \times X+b_0+b_1+b_2+b_3$ of $X+b_0$, $X+b_1$, $X+b_2$, and $X+b_3$ due to a time integration effect.

The value $2^2 \times X$ in the sum total $2^2 \times X+b_0+b_1+b_2+b_3$ is equal to (the dequantized $\Delta\Sigma$ modulation data obtained by dequantizing) the $\Delta\Sigma$ modulation data $ID(x, y)$, the upper six bits of the time-integration-effect-using error diffusion data OUT $(x, y)$.

Therefore, the value $2^2 \times X$ in the sum total $2^2 \times X+b_0+b_1+b_2+b_3$ obtained from the time integration effect contributes to an improvement in perceived gradation of a gradation-converted image using a space integration effect due to an effect of error diffusion in space directions of only a portion for the weight k' of the quantization error $Q(x, y)$.

The value $b_0+b_1+b_2+b_3$ in the sum total $2^2 \times X+b_0+b_1+b_2+b_3$ obtained from the time integration effect corresponds to the compensating data $Qt(x, y)$ in the lower two bits of the time-integration-effect-using error diffusion data OUT$(x, y)$.

The compensating data $Qt(x, y)$ is a 2-bit quantized value of the portion $k \times Q(x, y)$ of the quantization error $Q(x, y)$ and can be expressed as $Qt(x, y)=(1-k') \times Q(x, y)$ by using the above-described weight k'. Thus, the compensating data $Qt(x, y)$ corresponds to a portion for a weight $1-k'$ of the quantization error $Q(x, y)$.

Therefore, the value $b_0+b_1+b_2+b_3$ in the sum total $2^2 \times X+b_0+b_1+b_2+b_3$ obtained from the time integration effect corresponds to a portion for the weight $1-k'$ of the quantization error $Q(x, y)$. As described above, the value $b_0+b_1+b_2+b_3$ corresponds to a portion for the weight $1-k'$ of the quantization error $Q(x, y)$ and has an effect of compensating for (an effect of) error diffusion in space directions by the value $2^2 \times X$.

As described above, the compensating data $Qt(x, y)$ compensates for error diffusion in space directions by the value $2^2 \times X$ ($\Delta\Sigma$ modulation data $ID(x, y)$) when the four 6-bit pixel values $X+b_0$, $X+b_1$, $X+b_2$, and $X+b_3$ obtained after the FRC process are perceived as the sum total $2^2 \times X+b_0+b_1+b_2+b_3$ due to the time integration effect.

Therefore, the $\Delta\Sigma$ modulation data $ID(x, y)$ in the upper six bits of the time-integration-effect-using error diffusion data OUT$(x, y)$ generates an effect of error diffusion in space directions for a portion for the weight k' of the quantization error $Q(x, y)$. Furthermore, the compensating data $Qt(x, y)$ in the lower two bits of the time-integration-effect-using error diffusion data OUT$(x, y)$ generates an effect of FRC in a time direction for a portion for the weight $1-k'$ of the quantization error $Q(x, y)$, and the effect compensates for the effect of error diffusion in space directions.

As a result, according to the time-integration-effect-using error diffusion data OUT$(x, y)$, the entire data generates an effect of error diffusion in space directions for the entire quantization error $Q(x, y)$, so that perceived gradation equivalent to that in the case of error diffusion with only $\Delta\Sigma$ modulation can be realized in the target image data (it can be prevented that a perceived gradation level of the target image data becomes lower than that in the case of error diffusion with only $\Delta\Sigma$ modulation).

Furthermore, according to the time-integration-effect-using error diffusion data OUT$(x, y)$, a portion for the weight k' of the quantization error $Q(x, y)$ is diffused in space directions, whereas a portion for the weight $1-k'$ is distributed to the four pixel values $X+b_0$, $X+b_1$, $X+b_2$, and $X+b_3$ that are sequential in a time direction.

That is, the quantization error $Q(x, y)$ as noise is diffused not only in space directions, but is diffused (distributed) in space and time directions. Therefore, compared to a case where the quantization error $Q(x, y)$ as noise is diffused only in space directions, i.e., compared to a case where error diffusion with only $\Delta\Sigma$ modulation is performed on the target image data, a perceived image quality of a gradation-converted image displayed on the display 12 can be improved by preventing noticeable noise in the image.

The data processing unit 21 in FIG. 3 generates the above-described time-integration-effect-using error diffusion data OUT$(x, y)$ that generates an effect of the error diffusion method using a time integration effect from the target image data.

Data Processing Performed by the Data Processing Unit 21

Figure 5:
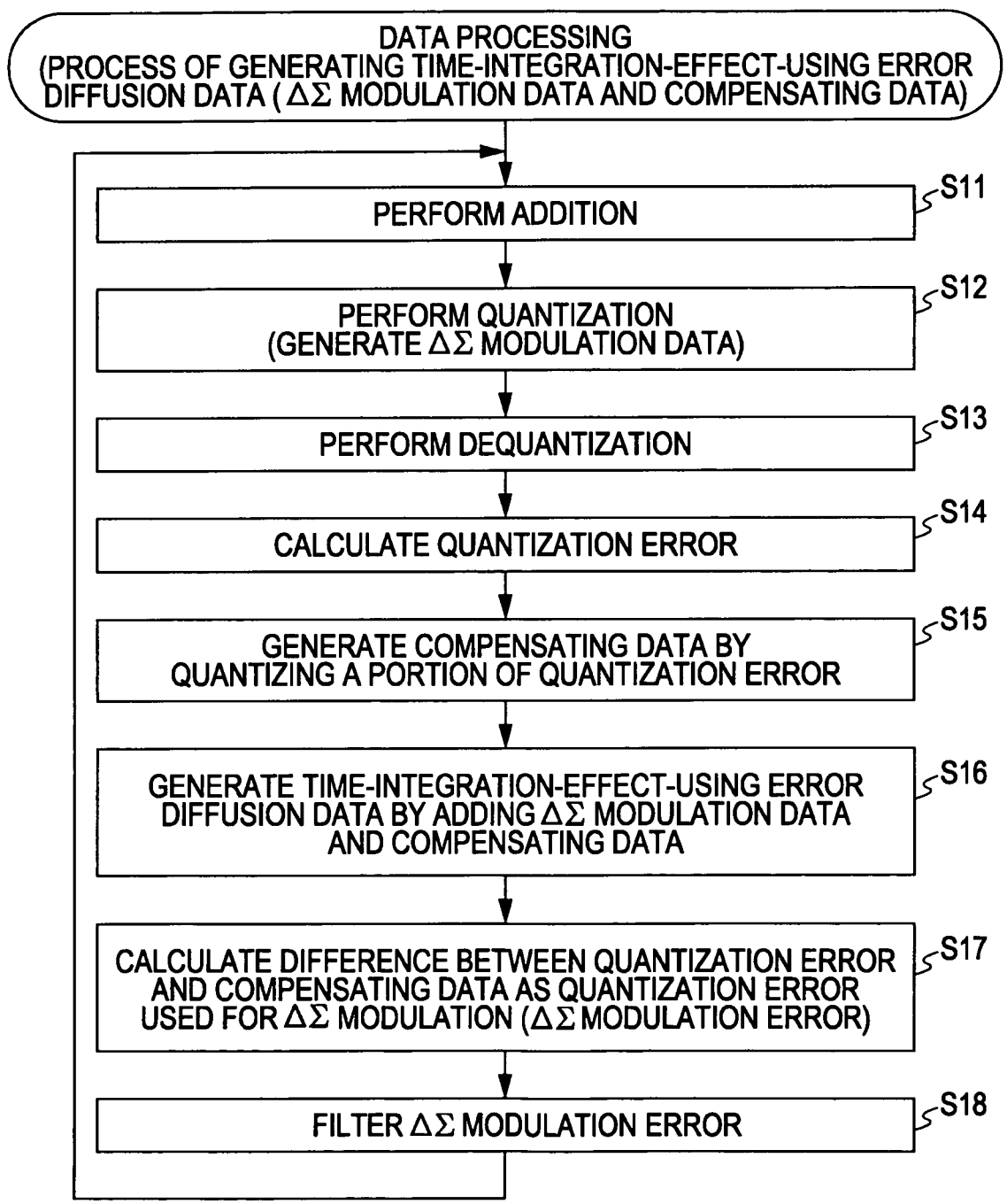
FIG. 5 is a flowchart illustrating data processing performed by the data processing unit.

With reference to FIG. 5, data processing performed by the data processing unit 21, that is, a process of generating time-integration-effect-using error diffusion data OUT$(x, y)$, is described.

The calculating unit 31 waits for and receives a pixel value of a pixel in target image data supplied thereto, and adds an output of the filter 35 while regarding the pixel having the supplied pixel value as a target pixel in step S11.

Specifically, in step S11, the calculating unit 31 adds the pixel value of the target pixel and a value obtained through the preceding filtering performed by the filter 35 in step S18 described below (an output of the filter 35), and outputs a sum value obtained thereby to the quantizing unit 32 and the calculating unit 33. Then, the process proceeds to step S12.

In step S12, the quantizing unit 32 quantizes the sum value as the output of the calculating unit 31, and outputs a quantized value including a quantization error, the quantized value serving as $\Delta\Sigma$ modulation data, to the calculating unit 33 and the dequantizing unit 38. Then, the process proceeds to step S13.

In step S13, the dequantizing unit 38 dequantizes the $\Delta\Sigma$ modulation data supplied from the quantizing unit 32 and supplies dequantized $\Delta\Sigma$ modulation data to the calculating unit 39. Then, the process proceeds from step S13 to step S14.

In step S14, the calculating unit 33 calculates a difference between the sum value as the output of the calculating unit 31 and the output of the quantizing unit 32 (the quantized value of the sum value as the output of the calculating unit 31, i.e., $\Delta\Sigma$ modulation data), thereby obtaining a quantization error of the quantization performed by the quantizing unit 32. Furthermore, the calculating unit 33 supplies the quantization error to the calculating units 34 and 36, and the process proceeds from step S14 to step S15.

In step S15, a portion of the quantization error is quantized, whereby compensating data is generated.

Specifically, in step S15, the calculating unit 36 multiplies the quantization error supplied from the calculating unit 33 by a weight k, thereby extracting a portion of the quantization error, and supplies the extracted portion to the quantizing unit 37. The quantizing unit 37 quantizes the portion of the quantization error supplied from the calculating unit 36, thereby generating compensating data as a portion for the weight k' of the quantization error, and supplies the compensating data to the calculating units 34 and 39. Then, the process proceeds from step S15 to step S16.

In step S16, the calculating unit 39 adds the dequantized $\Delta\Sigma$ modulation data supplied from the dequantizing unit 38 and the compensating data supplied from the quantizing unit 37, thereby generating time-integration-effect-using error diffusion data, and supplies the generated data to the FRC unit 22. Then, the process proceeds to step S17.

In step S17, the calculating unit 34 calculates a difference (1−k' of the quantization error) between the quantization error supplied from the calculating unit 33 and the compensating data supplied from the quantizing unit 37, the difference serving as a ΔΣ modulation error, which is a quantization error used for ΔΣ modulation performed by the ΔΣ modulator. Then, the calculating unit 34 supplies the ΔΣ modulation error to the filter 35, and the process proceeds to step S18.

In step S18, the filter 35 performs space-direction filtering on the ΔΣ modulation error supplied from the calculating unit 34, and supplies (outputs) a filtering result to the calculating unit 31.

Then, when a pixel value of a pixel next to the target pixel in the raster scanning order is supplied to the calculating unit 31, the process returns from step S18 to step S11.

In step S11, the calculating unit 31 regards the pixel next to the target pixel as a new target pixel, and adds the pixel value of the new target pixel and the filtering result supplied from the filter 35 in the preceding step S18. Thereafter, the same process is repeated.

As described above, time-integration-effect-using error diffusion data including ΔΣ modulation data (dequantized ΔΣ modulation data) and compensating data is generated by the data processing unit 21. Accordingly, a perceived image quality of a gradation-converted image can be improved by preventing noticeable noise without causing a decrease in perceived gradation level of the gradation-converted image.

That is, in a case where the time-integration-effect-using error diffusion data is displayed after the FRC process has been performed thereon, the ΔΣ modulation data ID(x, y) included in the time-integration-effect-using error diffusion data generates an effect of error diffusion in space directions of a portion for the weight k' of the quantization error. Furthermore, the compensating data included in the time-integration-effect-using error diffusion data OUT(x, y) generates an effect of FRC in a time direction of a portion for the weight 1−k' of the quantization error. This effect compensates for the effect of error diffusion in space directions.

Therefore, according to the time-integration-effect-using error diffusion data, the entire data generates an effect of error diffusion in space directions for the entire quantization error, so that perceived gradation equivalent to that in the case of error diffusion with only ΔΣ modulation can be realized in the target image data.

Furthermore, according to the time-integration-effect-using error diffusion data, a portion for the weight k' of the quantization error is diffused in space directions, whereas a portion for the weight 1−k' is distributed in a time direction. Therefore, a perceived image quality can be improved by preventing a quantization error from being noticeable as noise, compared to a case where the quantization error is diffused only in space directions.

In the calculating unit 36 of the data processing unit 21 (FIG. 3), the weight k multiplied by a quantization error (also weights k' and 1−k') can be a fixed value of 0.5, for example, or can be a variable value that varies in accordance with a user operation.

When the weight k is a variable value, the weight k can be set on the basis of an analysis result obtained by analyzing target image data in units of frames.

That is, in the data processing unit 21, a motion in a target frame (the frame of a target pixel) of target image data is detected by analyzing the target frame, and the weight k can be set on the basis of motion information indicating the motion.

As the motion information, a sum of absolute differences of pixel values of pixels at the same position in the target frame and the preceding frame can be adopted, for example.

As the weight k, a smaller value can be set as the value of the motion information is larger, that is, as the motion in the target frame is larger.

In the data processing unit 21, when the weight k is large, a quantization error diffused in a time direction is large whereas a quantization error diffused in space directions is small. On the other hand, when the weight k is small, a quantization error diffused in space directions is large whereas a quantization error diffused in a time direction is small.

If most of a quantization error is diffused in a time direction when the motion in a target frame is large, a negative influence may be exerted on a gradation-converted image. For this reason, when the motion in a target frame is large, the weight k of a small value is set so that the quantization error diffused in a time direction becomes small, as described above. Accordingly, a negative influence on a gradation-converted image can be prevented.

Specific Examples of the Filter 35

As the filter 35 (FIG. 3) of the data processing unit 21, a noise shaping filter used in the error diffusion method according to a related art can be adopted.

Examples of the noise shaping filter used in the error diffusion method according to the related art include a Jarvis, Judice & Ninke filter (hereinafter referred to as Jarvis filter) and a Floyd & Steinberg filter (hereinafter referred to as Floyd filter).

Figure 6:
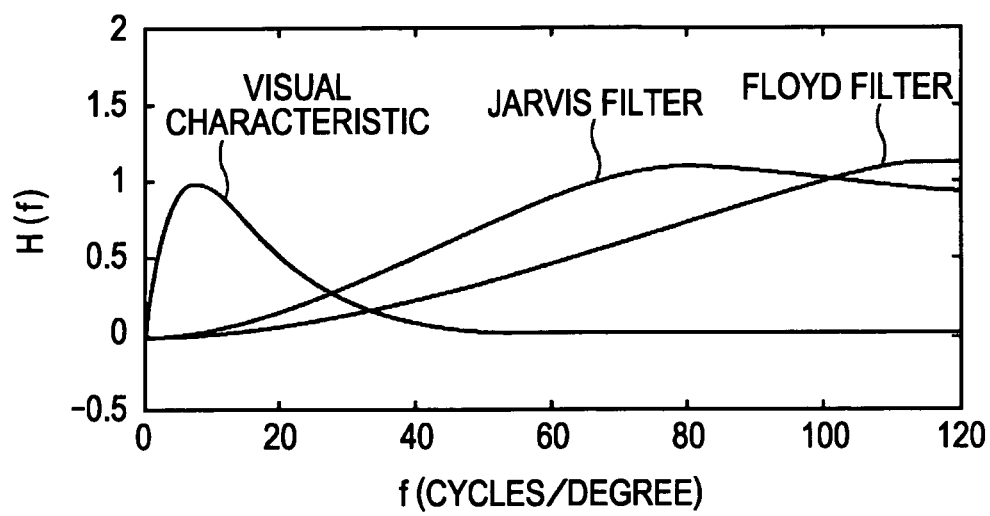
FIG. 6 illustrates an amplitude characteristic of noise shaping using a Jarvis filter and an amplitude characteristic of noise shaping using a Floyd filter.

FIG. 6 illustrates an amplitude characteristic of noise shaping using the Jarvis filter and an amplitude characteristic of noise shaping using the Floyd filter.

In FIG. 6, a contrast sensitivity curve indicating a spatial frequency characteristic of human vision (hereinafter also referred to as visual characteristic) is illustrated in addition to the amplitude characteristics of noise shaping.

In FIG. 6 (also in FIGS. 7, 8, 10B, 11B, and 12B described below), the horizontal axis indicates the spatial frequency, whereas the vertical axis indicates the gain for the amplitude characteristic or the sensitivity for the visual characteristic.

Here, the unit of the spatial frequency is cpd (cycles/degree), which indicates the number of stripes that are seen in the range of a unit angle of view (one degree in the angle of view). For example, 10 cpd means that ten pairs of a white line and a black line are seen in the range of one degree in the angle of view, and 20 cpd means that twenty pairs of a white line and a black line are seen in the range of one degree in the angle of view.

A gradation-converted image generated by the gradation converting unit 11 is eventually displayed on the display 12 (FIG. 1). Thus, from the viewpoint of improving the quality of the image to be displayed on the display 12, it is sufficient to consider up to a maximum spatial frequency of the image displayed on the display 12 (from 0 cpd) for the spatial frequency characteristic of human vision.

If the maximum spatial frequency of the image displayed on the display 12 is very high, e.g., about 120 cpd, noise (quantization error) is sufficiently modulated to a high range of a frequency band where the sensitivity of human vision is low by either of the Jarvis filter and the Floyd filter, as illustrated in FIG. 6.

The maximum spatial frequency of the image displayed on the display 12 depends on the resolution of the display 12 and the distance between the display 12 and a viewer who views the image displayed on the display 12 (hereinafter referred to as viewing distance).

Here, assume that the length in the vertical direction of the display 12 is H inches. In this case, about 2.5 H to 3.0 H is adopted as the viewing distance to obtain the maximum spatial frequency of the image displayed on the display 12.

In this case, for example, when the display 12 has a 40-inch display screen, having 1920 horizontal×1080 vertical pixels, for displaying a so-called full HD (High Definition) image, the maximum spatial frequency of the image displayed on the display 12 is about 30 cpd.

Figure 7:
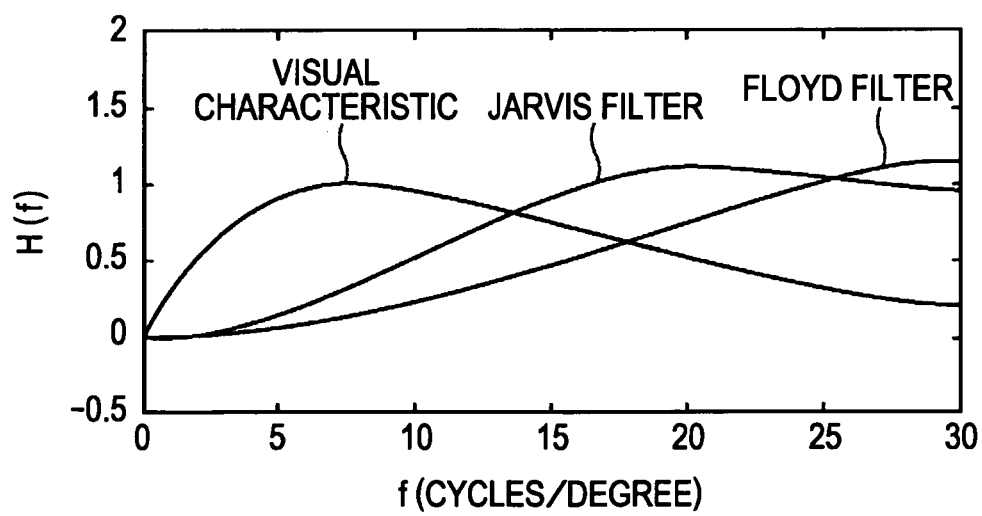
FIG. 7 illustrates an amplitude characteristic of noise shaping using the Jarvis filter and an amplitude characteristic of noise shaping using the Floyd filter.

FIG. 7 illustrates an amplitude characteristic of noise shaping using the Jarvis filter and an amplitude characteristic of noise shaping using the Floyd filter in a case where the maximum spatial frequency of the image displayed on the display 12 (FIG. 1) is about 30 cpd.

FIG. 7 also illustrates a visual characteristic, as in FIG. 6.

As illustrated in FIG. 7, in the case where the maximum spatial frequency of the image displayed on the display 12 is about 30 cpd, it is difficult for the Jarvis filter and the Floyd filter to sufficiently modulate noise to a high range of the frequency band where the sensitivity of human vision is sufficiently low.

Therefore, when the Jarvis filter or the Floyd filter is used, noise may be noticeable in a gradation-converted image, so that the perceived image quality thereof may be degraded.

Figure 8:
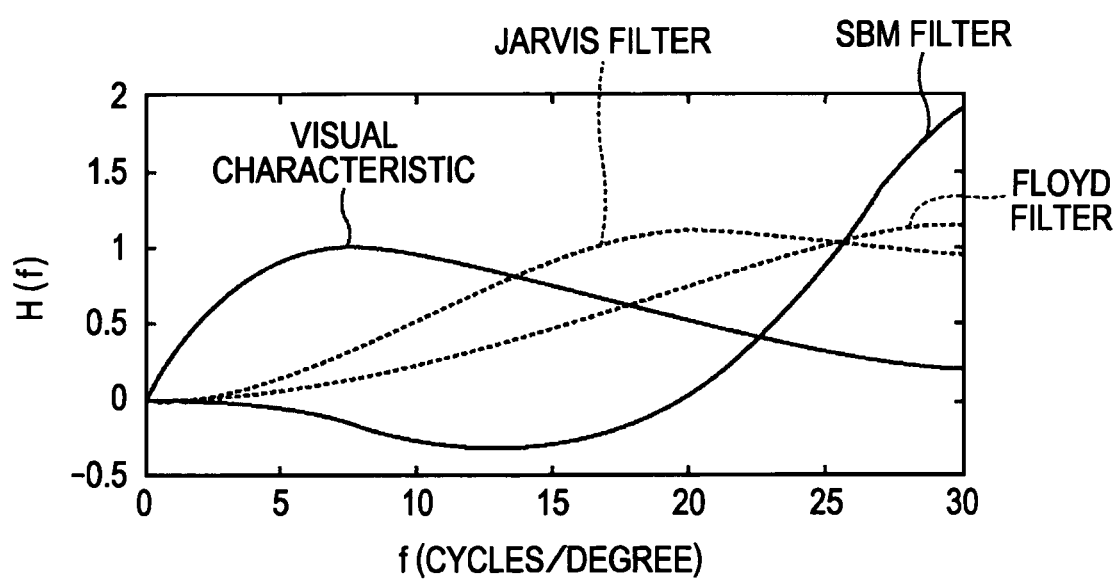
FIG. 8 illustrates an amplitude characteristic of noise shaping using an SBM filter.

In order to suppress degradation of the perceived image quality due to noticeable noise in the gradation-converted image, the amplitude characteristic of noise shaping illustrated in FIG. 8 is necessary.

That is, FIG. 8 illustrates an example of an amplitude characteristic of noise shaping for suppressing degradation of a perceived image quality (hereinafter referred to as degradation suppressing noise shaping) due to noticeable noise in the gradation-converted image.

Here, a noise shaping filter used for $\Delta\Sigma$ modulation to realize the degradation suppressing noise shaping is also called an SBM (Super Bit Mapping) filter.

FIG. 8 illustrates the visual characteristic, the amplitude characteristic of noise shaping using the Jarvis filter, and the amplitude characteristic of noise shaping using the Floyd filter illustrated in FIG. 7, in addition to the amplitude characteristic of the degradation suppressing noise shaping (noise shaping using the SBM filter).

In the amplitude characteristic of the degradation suppressing noise shaping, the characteristic curve in a midrange and higher has an upside-down shape (including a similar shape) of the visual characteristic curve (contrast sensitivity curve). Hereinafter, such a characteristic is called a reverse characteristic.

Furthermore, in the amplitude characteristic of the degradation suppressing noise shaping, the gain increases in a high range more steeply compared to that in the amplitude characteristic of noise shaping using the Jarvis filter or the Floyd filter.

Accordingly, in the degradation suppressing noise shaping, noise (quantization error) is modulated to a higher range where visual sensitivity is lower in a concentrated manner, compared to the noise shaping using the Jarvis filter or the Floyd filter.

By adopting the SBM filter as the filter 35 (FIG. 3), that is, by setting filter coefficients of the filter 35 so that the amplitude characteristic of noise shaping using the filter 35 has a reverse characteristic of the visual characteristic in the midrange and higher and that the gain increases in the high range more steeply compared to that in the amplitude characteristic of noise shaping based on $\Delta\Sigma$ modulation using the Floyd filter or the Jarvis filter, noise (quantization error) in the high range where the visual sensitivity is low is added to the pixel value IN(x, y) in the calculating unit 31 (FIG. 3). As a result, noise (quantization error) in the gradation-converted image can be prevented from being noticeable.

In the amplitude characteristic of noise shaping using the SBM filter illustrated in FIG. 8, the gain is well over 1 in the high range. This means that the quantization error is amplified more significantly in the high range compared to the case where the Jarvis filter or the Floyd filter is used.

Also, in the amplitude characteristic of noise shaping using the SBM filter illustrated in FIG. 8, the gain is negative in a low range to the midrange. Accordingly, the SBM filter can be constituted by a two-dimensional filter having a small number of taps.

That is, in a case of realizing an amplitude characteristic in which the gain is 0 in the low range and midrange and the gain steeply increases only in the high range as the amplitude characteristic of noise shaping using the SBM filter, the SBM filter is a two-dimensional filter having many taps (the number of taps is large).

On the other hand, in a case of realizing an amplitude characteristic of noise shaping using the SBM filter in which the gain is negative in the low range or midrange, the SBM filter can be constituted by a two-dimensional filter having a small number of taps, and the gain in the high range of noise shaping can be increased more steeply compared to the case of using the Jarvis filter or the Floyd filter.

Adopting such an SBM filter as the filter 35 enables the data processing unit 21 to be miniaturized.

Figure 9:
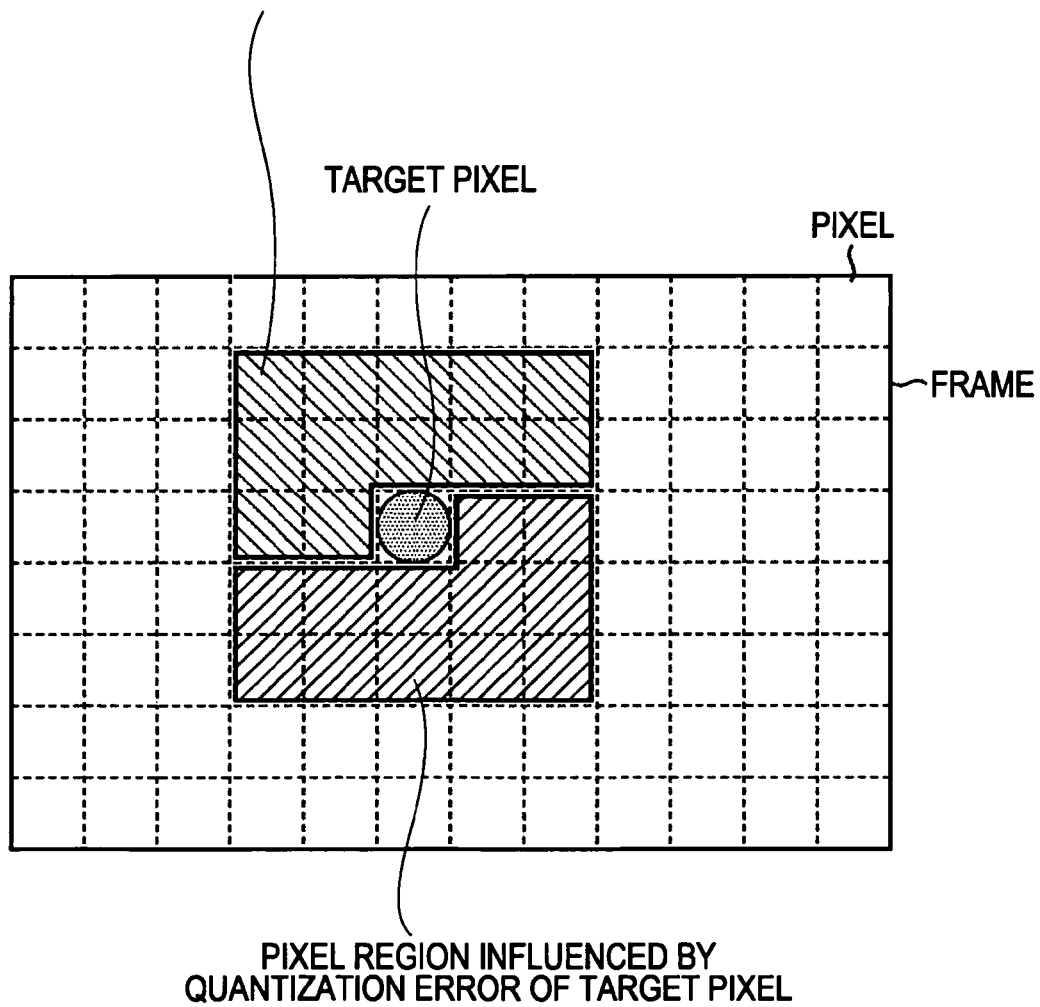
FIG. 9 illustrates a quantization error used for filtering.

FIG. 9 illustrates a quantization error used for filtering performed by the SBM filter described above.

In a case where the gain is to be negative in the low range or midrange in the amplitude characteristic of noise shaping, the SBM filter can be constituted by a 12-tap two-dimensional filter that performs filtering by using quantization errors of twelve pixels on which gradation conversion has already been performed in the raster scanning order (the pixels with downward-sloping lines in FIG. 9) among 5×5 pixels with a target pixel being at the center.

In a case where such an SBM filter is adopted as the filter 35 (FIG. 3), the quantization error of the target pixel is diffused to pixels on which gradation conversion is to be performed in the raster scanning order (prospective target pixels, i.e., the pixels with upward-sloping lines in FIG. 9) among the 5×5 pixels with the target pixel being at the center.

Specific Examples of Filter Coefficients and Noise Shaping Characteristic

Figures 10A, 10B:
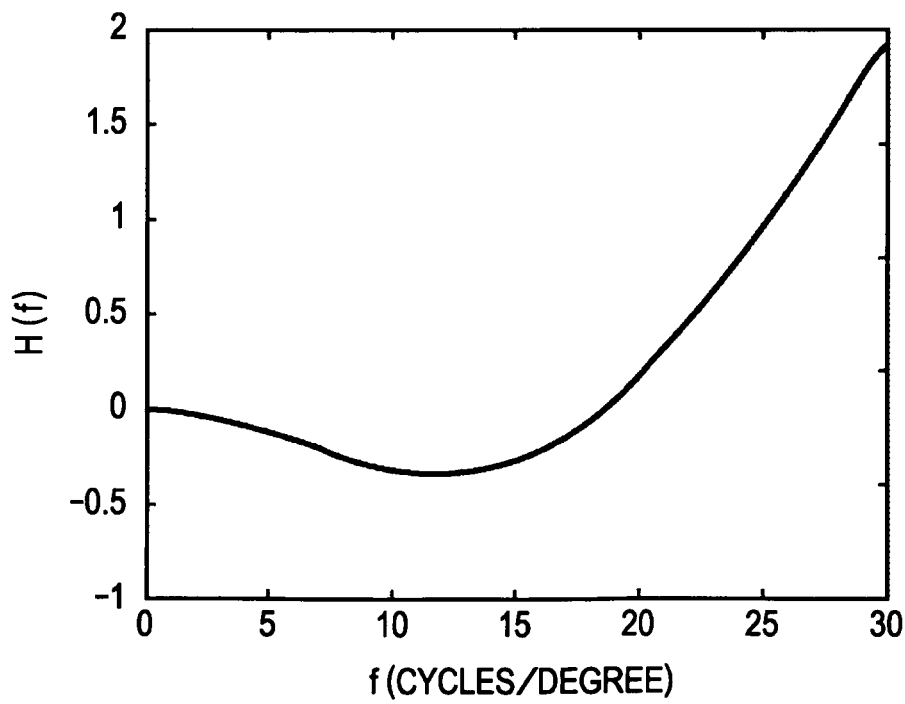
FIGS. 10A and 10B illustrate a first example of filter coefficients and an amplitude characteristic of noise shaping using the SBM filter.

FIGS. 10A and 10B illustrate a first example of filter coefficients and an amplitude characteristic of noise shaping using the SBM filter in a case where the maximum spatial frequency of the image displayed on the display 12 that displays a gradation-converted image is 30 cpd.

Specifically, FIG. 10A illustrates a first example of filter coefficients of the 12-tap SBM filter, the filter coefficients being determined so that the gain in the amplitude characteristic of noise shaping is negative in the low range or midrange and increases in the high range more steeply compared to that in the amplitude characteristic of noise shaping based on $\Delta\Sigma$ modulation using the Floyd filter.

In FIG. 10A, filter coefficients g(1, 1)=−0.0317, g(2, 1)=−0.1267, g(3, 1)=−0.1900, g(4, 1)=−0.1267, g(5, 1)=−0.0317, g(1, 2)=−0.1267, g(2, 2)=0.2406, g(3, 2)=0.7345, g(4, 2)=0.2406, g(5, 2)=−0.1267, g(1, 3)=−0.1900, and g(2, 3)=0.7345 are adopted as the filter coefficients of the 12-tap SBM filter.

Here, the SBM filter is a two-dimensional FIR filter. The filter coefficient g(i, j) is a filter coefficient multiplied by a quantization error of the pixel i-th from the left and j-th from the top in 12 pixels on which gradation conversion has already been performed in the raster scanning order among 5 horizontal×5 vertical pixels with a target pixel being at the center described above with reference to FIG. 9.

FIG. 10B illustrates an amplitude characteristic of noise shaping using the SBM filter in a case where the SBM filter has the filter coefficients illustrated in FIG. 10A.

In the amplitude characteristic of noise shaping in FIG. 10B, the gain is 0 when the frequency f is 0, the gain is negative in the low range or midrange, and the gain increases in the high range more steeply compared to that in the amplitude characteristic of noise shaping based on $\Delta\Sigma$ modulation using the Floyd filter (and the Jarvis filter).

Figures 11A, 11B:
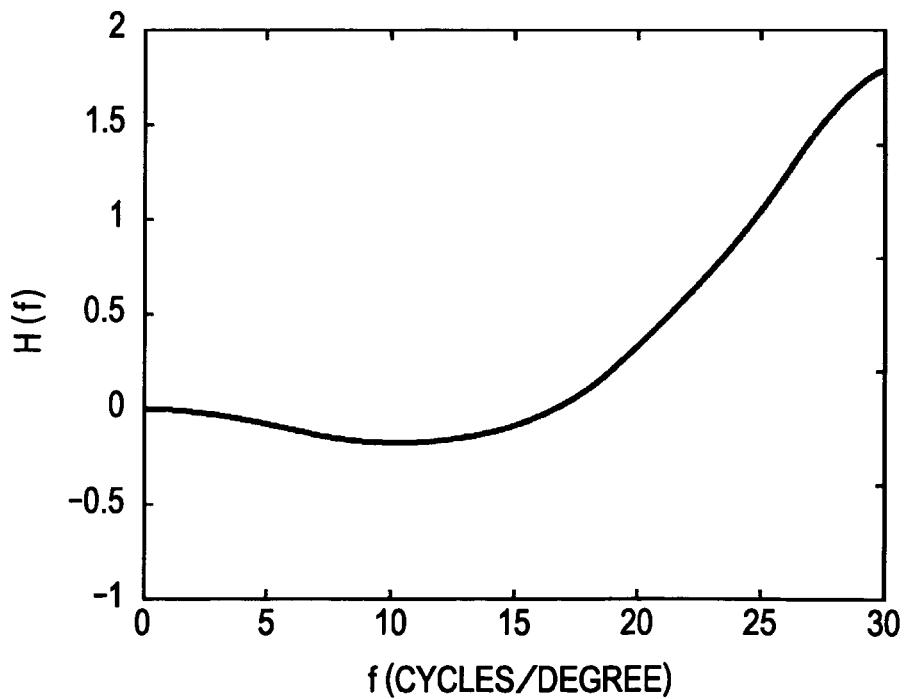
FIGS. 11A and 11B illustrate a second example of filter coefficients and an amplitude characteristic of noise shaping using the SBM filter.

FIGS. 11A and 11B illustrate a second example of filter coefficients and an amplitude characteristic of noise shaping using the SBM filter in a case where the maximum spatial frequency of the image displayed on the display 12 that displays a gradation-converted image is 30 cpd.

Specifically, FIG. 11A illustrates a second example of filter coefficients of the 12-tap SBM filter, the filter coefficients being determined so that the gain in the amplitude characteristic of noise shaping is negative in the low range or midrange and increases in the high range more steeply compared to that in the amplitude characteristic of noise shaping based on $\Delta\Sigma$ modulation using the Floyd filter.

In FIG. 11A, filter coefficients $g(1, 1)=-0.0249$, $g(2, 1)=-0.0996$, $g(3, 1)=-0.1494$, $g(4, 1)=-0.0996$, $g(5, 1)=-0.0249$, $g(1, 2)=-0.0996$, $g(2, 2)=0.2248$, $g(3, 2)=0.6487$, $g(4, 2)=0.2248$, $g(5, 2)=-0.0996$, $g(1, 3)=-0.1494$, and $g(2, 3)=0.6487$ are adopted as the filter coefficients of the 12-tap SBM filter.

FIG. 11B illustrates an amplitude characteristic of noise shaping using the SBM filter in a case where the SBM filter has the filter coefficients illustrated in FIG. 11A.

In the amplitude characteristic of noise shaping in FIG. 11B, the gain is 0 when the frequency f is 0, the gain is negative in the low range or midrange, and the gain increases in the high range more steeply compared to that in the amplitude characteristic of noise shaping based on $\Delta\Sigma$ modulation using the Floyd filter.

Figures 12A, 12B:
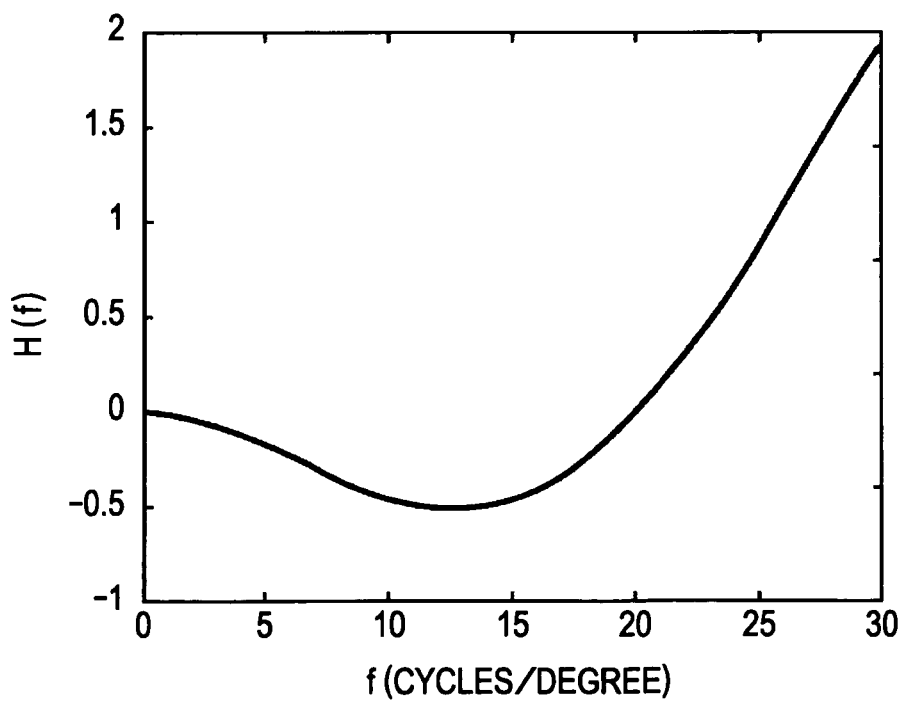
FIGS. 12A and 12B illustrate a third example of filter coefficients and an amplitude characteristic of noise shaping using the SBM filter.

FIGS. 12A and 12B illustrate a third example of filter coefficients and an amplitude characteristic of noise shaping using the SBM filter in a case where the maximum spatial frequency of the image displayed on the display 12 that displays a gradation-converted image is 30 cpd.

Specifically, FIG. 12A illustrates a third example of filter coefficients of the 12-tap SBM filter, the filter coefficients being determined so that the gain in the amplitude characteristic of noise shaping is negative in the low range or midrange and increases in the high range more steeply compared to that in the amplitude characteristic of noise shaping based on $\Delta\Sigma$ modulation using the Floyd filter.

In FIG. 12A, filter coefficients $g(1, 1)=-0.0397$, $g(2, 1)=-0.1586$, $g(3, 1)=-0.2379$, $g(4, 1)=-0.1586$, $g(5, 1)=-0.0397$, $g(1, 2)=-0.1586$, $g(2, 2)=0.2592$, $g(3, 2)=0.8356$, $g(4, 2)=0.2592$, $g(5, 2)=-0.1586$, $g(1, 3)=-0.2379$, and $g(2, 3)=0.8356$ are adopted as the filter coefficients of the 12-tap SBM filter.

FIG. 12B illustrates an amplitude characteristic of noise shaping using the SBM filter in a case where the SBM filter has the filter coefficients illustrated in FIG. 12A.

In the amplitude characteristic of noise shaping in FIG. 12B, the gain is 0 when the frequency f is 0, the gain is negative in the low range or midrange, and the gain increases in the high range more steeply compared to that in the amplitude characteristic of noise shaping based on $\Delta\Sigma$ modulation using the Floyd filter.

The filter coefficients of the 12-tap SBM filter illustrated in FIGS. 10A, 11A, and 12A include negative values, and thus the gain in the amplitude characteristic of noise shaping is negative in the low range or midrange. In this way, by allowing the gain in the amplitude characteristic of noise shaping to be negative in the low range or midrange, the amplitude characteristic of noise shaping in which the gain steeply increases in the high range can be realized by an SBM filter having a small number of taps, such as 12 taps.

Additionally, according to a simulation that was performed by using SBM filters having the filter coefficients illustrated in FIGS. 10A, 11A, and 12A as the filter 35, a gradation-converted image having a high perceived quality could be obtained in all of the SBM filters.

Descriptions have been given about a case where an embodiment of the present invention is applied to the image processing apparatus (FIG. 1) that performs gradation conversion on an 8-bit target image to generate a 6-bit image and that displays the 6-bit image on the display 12, which is a 6-bit LCD. However, the embodiment of the present invention can also be applied to other cases of performing gradation conversion on an image.

For example, in a case of performing color space conversion of converting an image in which each of YUV components is 8 bits into an image having each of RGB components as a pixel value and then displaying the image that has been obtained through the color space conversion and that has RGB components as a pixel value on an 8-bit LCD, an image in which each of RGB components exceeds the original 8 bits, e.g., expanded to 16 bits, may be obtained through the color space conversion. In this case, it is necessary to perform gradation conversion on the image in which each of RGB components has been expanded to 16 bits in order to obtain an 8-bit image that can be displayed on the 8-bit LCD. The embodiment of the present invention can also be applied to such gradation conversion.

Exemplary Configuration of a Computer According to an Embodiment of the Present Invention The above-described series of processes can be performed by either of hardware and software. When the series of processes are performed by software, a program constituting the software is installed to a multi-purpose computer or the like.

Figure 13:
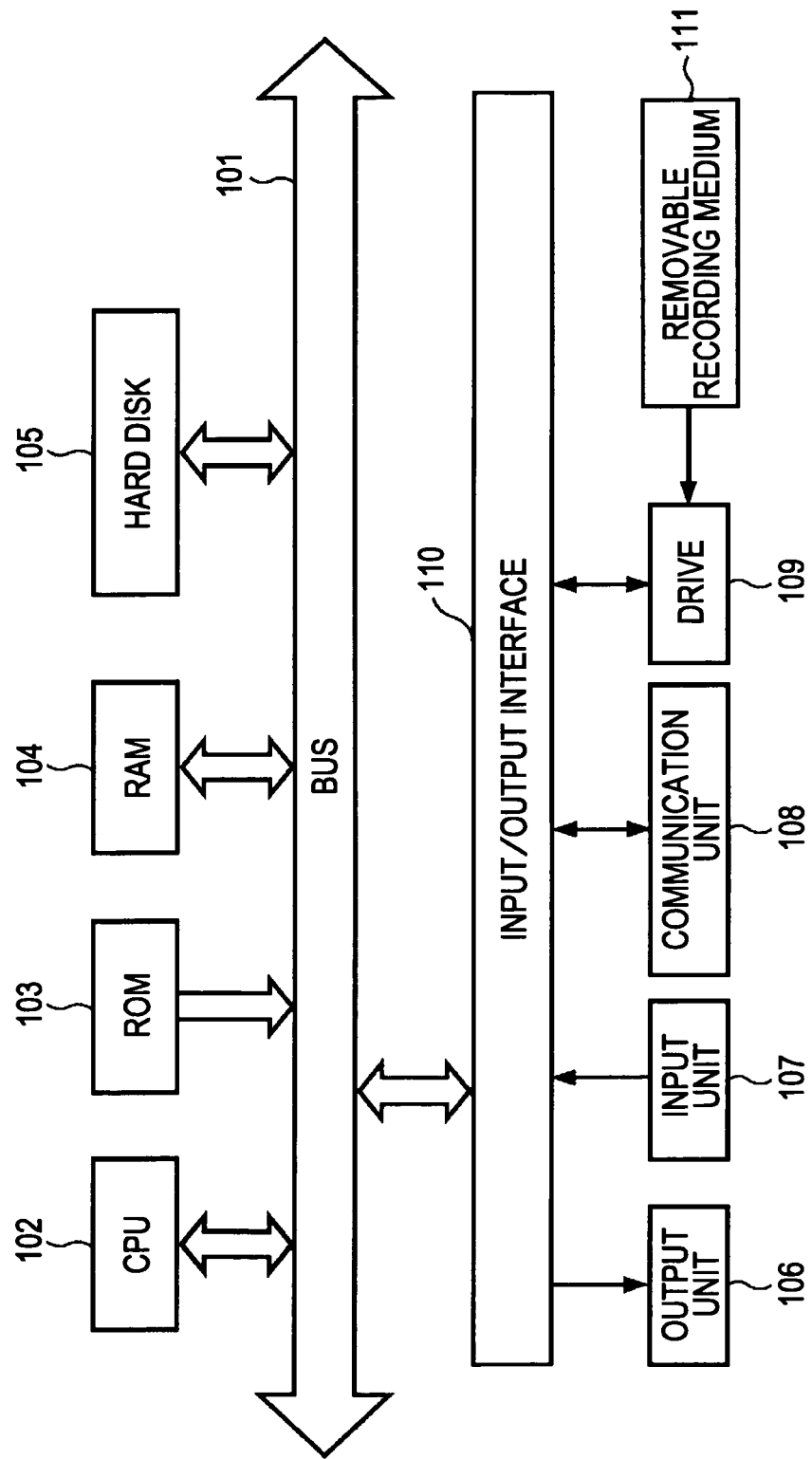
FIG. 13 is a block diagram illustrating an exemplary configuration of a computer according to an embodiment of the present invention.

FIG. 13 illustrates an exemplary configuration of a computer to which the program for executing the above-described series of processes is installed according to an embodiment.

The program can be recorded in advance in a hard disk 105 or a ROM (Read Only Memory) 103 serving as a recording medium mounted in the computer.

Alternatively, the program can be stored (recorded) temporarily or permanently in a removable recording medium 111, such as a flexible disk, a CD-ROM (Compact Disc Read Only Memory), an MO (Magneto Optical) disc, a DVD (Digital Versatile Disc), a magnetic disk, or a semiconductor memory. The removable recording medium 111 can be provided as so-called package software.

The program can be installed to the computer via the above-described removable recording medium 111. Also, the program can be transferred to the computer from a download site via an artificial satellite for digital satellite broadcast in a wireless manner, or can be transferred to the computer via a network such as a LAN (Local Area Network) or the Internet in a wired manner. The computer can receive the program transferred in that manner by using a communication unit 108 and can install the program to the hard disk 105 mounted therein.

The computer includes a CPU (Central Processing Unit) 102. An input/output interface 110 is connected to the CPU 102 via a bus 101. When a command is input to the CPU 102 by a user operation of an input unit 107 including a keyboard, a mouse, and a microphone via the input/output interface 110, the CPU 102 executes the program stored in the ROM 103 in response to the command. Alternatively, the CPU 102 loads, to a RAM (Random Access Memory) 104, the program stored in the hard disk 105, the program transferred via a satellite or a network, received by the communication unit 108, and installed to the hard disk 105, or the program read from the removable recording medium 111 loaded into a drive 109 and installed to the hard disk 105, and executes the program. Accordingly, the CPU 102 performs the process in accordance with the above-described flowchart or the process performed by the above-described configurations illustrated in the block diagrams. Then, the CPU 102 allows an output unit 106 including an LCD (Liquid Crystal Display) and a speaker to output, allows the communication unit 108 to transmit, or allows the hard disk 105 to record a processing result via the input/output interface 110 as necessary.

In this specification, the process steps describing the program allowing the computer to execute various processes are not necessarily performed in time series along the order described in a flowchart, but may be performed in parallel or individually (e.g., a parallel process or a process by an object is acceptable).

The program may be processed by a single computer or may be processed in a distributed manner by a plurality of computers. Furthermore, the program may be executed by being transferred to a remote computer.

Embodiments of the present invention are not limited to the above-described embodiments, and various modifications are acceptable without deviating from the scope of the present invention.

For example, in the above-described embodiment, the gradation converting unit 11 performs gradation conversion on 8-bit target image data having a frame rate of 60 Hz to eventually obtain 6-bit gradation-converted image data having a frame rate of 240 Hz, four times 60 Hz. However, when the target image data is substantially still image data (e.g., data of an image with no object moving at high speed), the gradation converting unit 11 can convert the 8-bit target image data having a frame rate of 60 Hz into 6-bit gradation-converted image data having a frame rate of 60 Hz.

For example, in a case where the image processing apparatus illustrated in FIG. 1 is applied to a so-called notebook PC (Personal Computer) in which an image of an object moving at high speed is less likely to be displayed, the data processing unit 21 of the gradation converting unit 11 performs data processing on every fourth frame of the 8-bit target image data having a frame rate of 60 Hz, thereby generating time-integration-effect-using error diffusion data having a frame rate of quarter of 60 Hz. Then, an FRC process is performed on the time-integration-effect-using error diffusion data having a frame rate of quarter of 60 Hz, whereby 6-bit gradation-converted image data having an original frame rate of 60 Hz can be obtained.

In this case, the FRC unit 22 that handles image data of a high frame rate, such as 240 Hz, is unnecessary. Furthermore, an LCD having a display rate of 60 Hz, not an LCD having a high display rate of 240 Hz, can be adopted as the display 12.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
first calculating means for adding a pixel value of an image and an output of filter means for performing filtering in space directions on a modulation error of a quantized value obtained by quantizing the pixel value of the image;
first quantizing means for quantizing an output of the first calculating means and outputting a quantized value serving as ΔΣ modulation data, which is a result of ΔΣ modulation performed on the pixel value;
second calculating means for calculating a difference between the output of the first calculating means and the output of the first quantizing means, thereby obtaining a quantization error;
second quantizing means for quantizing a portion of the quantization error and outputting a quantized value obtained through the quantization, the quantized value serving as compensating data for compensating for error diffusion in space directions;
dequantizing means for dequantizing the ΔΣ modulation data;
third calculating means for adding the dequantized ΔΣ modulation data and the compensating data, thereby generating time-integration-effect-using error diffusion data that generates an effect of an error diffusion method using a visual integration effect in a time direction;
fourth calculating means for calculating a difference between the quantization error and the compensating data, the difference serving as a ΔΣ modulation error, which is a quantization error used for the ΔΣ modulation; and
the filter means for performing filtering in space directions on the ΔΣ modulation error.

2. The image processing apparatus according to claim 1, wherein, in a case where the pixel value of the image is N bits and where the first quantizing means outputs a quantized value of M bits (M smaller than N) the ΔΣ modulation data,
the dequantizing means dequantizes the ΔΣ modulation data into N bits;
the second quantizing means quantizes the portion of the quantization error into N-M bits and outputs a quantized portion obtained thereby as N-M-bit compensating data, and
the third calculating means adds the ΔΣ modulation data
the third calculating means adds the N-bit dequantized ΔΣ modulation data and the N-M-bit compensating data, thereby generating N-bit time-integration-effect-using error diffusion data.

3. The image processing apparatus according to claim 2, further comprising:
frame rate control means for performing a converting process of converting the time-integration-effect-using error diffusion data of N bits into a pixel value of M bits by using a frame rate control process.

4. The image processing apparatus according to claim 1, wherein filter coefficients of filtering performed by the filter means are determined so that an amplitude characteristic of noise shaping performed based on the ΔΣ modulation becomes a reverse characteristic of a human visual characteristic in a midrange and higher and that a gain in the amplitude characteristic increases in a high range more steeply compared to a gain in an amplitude characteristic of noise shaping performed based on ΔΣ modulation using a Floyd filter.

5. The image processing apparatus according to claim 1, wherein filter coefficients of filtering performed by the filter means are determined so that a gain in an amplitude characteristic of noise shaping performed based on the $\Delta\Sigma$ modulation is negative in a low range or midrange and increases in a high range more steeply compared to a gain in an amplitude characteristic of noise shaping performed based on $\Delta\Sigma$ modulation using a Floyd filter.

6. The image processing apparatus according to claim 1, wherein filter coefficients of filtering performed by the filter means include a negative value and are determined so that a gain in an amplitude characteristic of noise shaping performed based on the $\Delta\Sigma$ modulation increases in a high range more steeply compared to a gain in an amplitude characteristic of noise shaping performed based on $\Delta\Sigma$ modulation using a Floyd filter.

7. An image processing method for an image process apparatus including first calculating means for adding a pixel value of an image and an output of filter means for performing filtering in space directions on a modulation error of a quantized value obtained by quantizing the pixel value of the image; first quantizing means for quantizing an output of the first calculating means and outputting a quantized value serving as $\Delta\Sigma$ modulation data, which is a result of $\Delta\Sigma$ modulation performed on the pixel value; second calculating means for calculating a difference between the output of the first calculating means and the output of the first quantizing means, thereby obtaining a quantization error; second quantizing means for quantizing a portion of the quantization error and outputting a quantized value obtained through the quantization, the quantized value serving as compensating data for compensating for error diffusion in space directions; dequantizing means for dequantizing the $\Delta\Sigma$ modulation data; third calculating means for adding the dequantized $\Delta\Sigma$ modulation data and the compensating data, thereby generating time-integration-effect-using error diffusion data that generates an effect of an error diffusion method using a visual integration effect in a time direction; fourth calculating means for calculating a difference between the quantization error and the compensating data, the difference serving as a $\Delta\Sigma$ modulation error, which is a quantization error used for the $\Delta\Sigma$ modulation; and the filter means for performing filtering in space directions on the $\Delta\Sigma$ modulation error, the image processing method comprising the steps of:
adding the pixel value of the image and the output of the filter means, the adding being performed by the first calculating means;
quantizing the output of the first calculating means and outputting the quantized value including the quantization error, the quantized value serving as the $\Delta\Sigma$ modulation data, the quantizing and the outputting being performed by the first quantizing means;
calculating the difference between the output of the first calculating means and the quantized value of the output of the first calculating means, thereby obtaining the quantization error, the calculating being performed by the second calculating means;
quantizing the portion of the quantization error and outputting the compensating data, the quantizing and the outputting being performed by the second quantizing means;
dequantizing the $\Delta\Sigma$ modulation data;
adding the dequantized $\Delta\Sigma$ modulation data and the compensating data, thereby generating the time-integration-effect-using error diffusion data, the adding being performed by the third calculating means;
calculating the difference between the quantization error and the compensating data, the difference serving as the $\Delta\Sigma$ modulation error, the calculating being performed by the fourth calculating means; and
performing filtering in space directions on the $\Delta\Sigma$ modulation error, the performing being performed by the filter means.

8. A non-transitory computer-readable medium having stored thereon a computer-readable program causing a computer to carry out the following steps
first calculating step for adding a pixel value of an image and an output of filter step for performing filtering in space directions on a modulation error of a quantized value obtained by quantizing the pixel value of the image;
first quantizing step for quantizing an output of the first calculating step and outputting a quantized value serving as $\Delta\Sigma$ modulation data, which is a result of $\Delta\Sigma$ modulation performed on the pixel value;
second calculating step for calculating a difference between the output of the first calculating step and the output of the first quantizing step, thereby obtaining a quantization error;
second quantizing step for quantizing a portion of the quantization error and outputting a quantized value obtained through the quantization, the quantized value serving as compensating data for compensating for error diffusion in space directions;
dequantizing means for dequantizing the $\Delta\Sigma$ modulation data;
third calculating step for adding the dequantized $\Delta\Sigma$ modulation data and the compensating data, thereby generating time-integration-effect-using error diffusion data that generates an effect of an error diffusion method using a visual integration effect in a time direction;
fourth calculating step for calculating a difference between the quantization error and the compensating data, the difference serving as a $\Delta\Sigma$ modulation error, which is a quantization error used for the $\Delta\Sigma$ modulation; and
the filter step for performing filtering in space directions on the $\Delta\Sigma$ modulation error.

9. An image processing apparatus comprising:
a first calculating unit configured to add a pixel value of an image and an output of a filter unit configured to perform filtering in space directions on a modulation error of a quantized value obtained by quantizing the pixel value of the image;
a first quantizing unit configured to quantize an output of the first calculating unit and output a quantized value serving as $\Delta\Sigma$ modulation data, which is a result of $\Delta\Sigma$ modulation performed on the pixel value;
a second calculating unit configured to calculate a difference between the output of the first calculating unit and the output of the first quantizing unit, thereby obtaining a quantization error;
a second quantizing unit configured to quantize a portion of the quantization error and output a quantized value obtained through the quantization, the quantized value serving as compensating data for compensating for error diffusion in space directions;
dequantizing means for dequantizing the $\Delta\Sigma$ modulation data;
a third calculating unit configured to add the dequantized $\Delta\Sigma$ modulation data and the compensating data, thereby generating time-integration-effect-using error diffusion data that generates an effect of an error diffusion method using a visual integration effect in a time direction;

a fourth calculating unit configured to calculate a difference between the quantization error and the compensating data, the difference serving as a ΔΣ modulation error, which is a quantization error used for the ΔΣ modulation; and the filter unit configured to perform filtering in space directions on the ΔΣ modulation error.

\* \* \* \* \*